United States Patent
Singhai et al.

(10) Patent No.: US 7,613,281 B2
(45) Date of Patent: Nov. 3, 2009

(54) MONITORING A RESPONSE TIME FOR A USER REQUEST

(75) Inventors: Prashant Kumar Singhai, Bangalore (IN); Satyesh Singh, Bangalore (IN)

(73) Assignee: SAP AG, Walldorf (DE)

( * ) Notice: Subject to any disclaimer, the term of this patent is extended or adjusted under 35 U.S.C. 154(b) by 344 days.

(21) Appl. No.: 11/300,569

(22) Filed: Dec. 13, 2005

(65) Prior Publication Data

US 2007/0136303 A1 Jun. 14, 2007

(51) Int. Cl.
*H04M 1/64* (2006.01)
*H04M 11/00* (2006.01)
*G06F 17/30* (2006.01)

(52) U.S. Cl. .............................. 379/88.12; 379/100.06; 707/10

(58) Field of Classification Search ................... 707/10; 379/211.01, 100.06, 88.12, 207.03; 709/204; 719/314

See application file for complete search history.

(56) References Cited

U.S. PATENT DOCUMENTS

| 6,848,107 B1 * | 1/2005 | Komine et al. ............... 719/314 |
| 2005/0021617 A1 * | 1/2005 | Rusitschka ................... 709/204 |
| 2005/0041793 A1 * | 2/2005 | Fulton et al. ........... 379/211.01 |

\* cited by examiner

*Primary Examiner*—Hung T Vy
(74) *Attorney, Agent, or Firm*—Kenyon & Kenyon LLP

(57) ABSTRACT

A processing system allows for the monitoring of user requests such that a response may be provided within a defined maximum processing time (MPT). The user request relating to issues or concerns with a product or application/usage of the product is received through an input portal, such as a web site. The user request is assigned a response time, typically based on the type of request, where the response time indicates a preferred guideline for how quickly an assistant should provide a response. Once the request has been assigned to an assistant, a notification is generated to inform the assistant about the user request and the corresponding deadline for response. At a pre-determined time prior to the expiration of the response time, it is determined if the response has been provided. If the response has not been provided, a reminder is generated to inform the assistant of the pending deadline.

13 Claims, 4 Drawing Sheets

MONITORING A RESPONSE TIME FOR A USER REQUEST

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to processing a user request and more specifically to monitoring time utilized for processing and responding to such request.

As the size of software applications and other computer processing systems continue to expand, there is an ever-increasing level of complexity involved not only in using the product, but also learning to use the product. It is not uncommon in these systems for users to encounter problems or have issues related to the product.

A common technique for dealing with user issues is the receipt of user inquiries. These inquires may be received from a variety of sources, such as from a user submitting an electronic message using a customer-assistance web site. Through an interactive process using a browser or other application, the user may type in a user request and designate the request for a particular product. The request may be automatically designated based on the web site from which the request is submitted or the user may use pull down menus or other features to designate the corresponding product.

In existing systems, the user request is provided to a support team. In the example of an electronic message, the inquiry may be converted to an electronic mail message and electronically mailed to one or more persons. The person then attempts to reply to the inquiry as quickly as possible. Often times, the user may simply utilizes a FIFO (first in first out) approach and respond to the inquiries in the order they are received.

This process is relatively automated but problems can arise when dealing with various assistants. The current system simply provides these messages and it is the responsibility of the recipient to process and manage the requests. In dealing with customer concerns, it is a common practice to set guidelines for when a response should be provided. For example, a time may be established that any inquiry should be handled in forty eight (48) hours or less.

The timing of the response to the user inquiry can be greatly affected by a large number of factors. Common among them, the availability of the assistant is a common issue. For example, the assistant may be out of the office for a period of time for different reasons and these user concerns may be idly queued without system oversight. Therefore, while the assistant may be on vacation or at a training program, the recommended response time expires without a response being provided.

Another common concern is the work load of the assistant. As the number of inquiries increase, the assistant may be unable to effectively address the new concerns in a timely manner. Once again, in the existing systems, these user concerns are automatically processed and queued up for the assistants. Therefore, even though the assistant may be diligently attending to existing user concerns, the recommended response time period may still not be met.

The existing system can be problematic because the automated functionality of receiving the user inquiries and thereby queuing these inquiries with an external response time factor associated therewith. The automated process does not include the time features and also does not account for the type of the user request. Rather, all requests are similarly processed, leading to problems if there are issues associated with availability of the assistant.

The current system also lacks any monitoring or feedback mechanism. As noted, this system merely processes the request and forwards the request to one or more queues. The system does not have the ability to determine if and when an inquiry is addressed. Therefore, it is possible for an inquiry to be overlooked and a user inquiry to never be addressed.

Issues relating to responses to customers inquiries are further magnified when dealing with large and complex processing systems. In multi-level processing environments having various levels of applications and functionalities, there may be a larger number of user inquiries. And with further systems having specialized features, problems can also arise regarding the assistant being the proper person to address the issue. Therefore, the current system processes the inquires to the assistants, but does not monitor timeliness of responses within external mandated guidelines.

DETAILED DESCRIPTION

Generally, a processing system allows for the monitoring of user requests such that a response may be provided within a defined maximum processing time (MPT). The user request, typically relating to issues or concerns with a product or application/usage of the product, is received through an input portal, such as a web site. The user request is assigned a response time, typically based on the type of request, where the response time indicates a preferred guideline for how quickly an assistant should provide a response. Once the request has been assigned to an assistant, a notification is generated to inform the assistant about the user request and the corresponding deadline for response. At a pre-determined time prior to the expiration of the response time, it is determined if the response has been provided. If the response has not been provided, a reminder is generated to inform the assistant of the pending deadline. In further embodiments, the notification may then be submitted to another assistant or other steps taken to insure prompt response to the user request.

Figure 1:
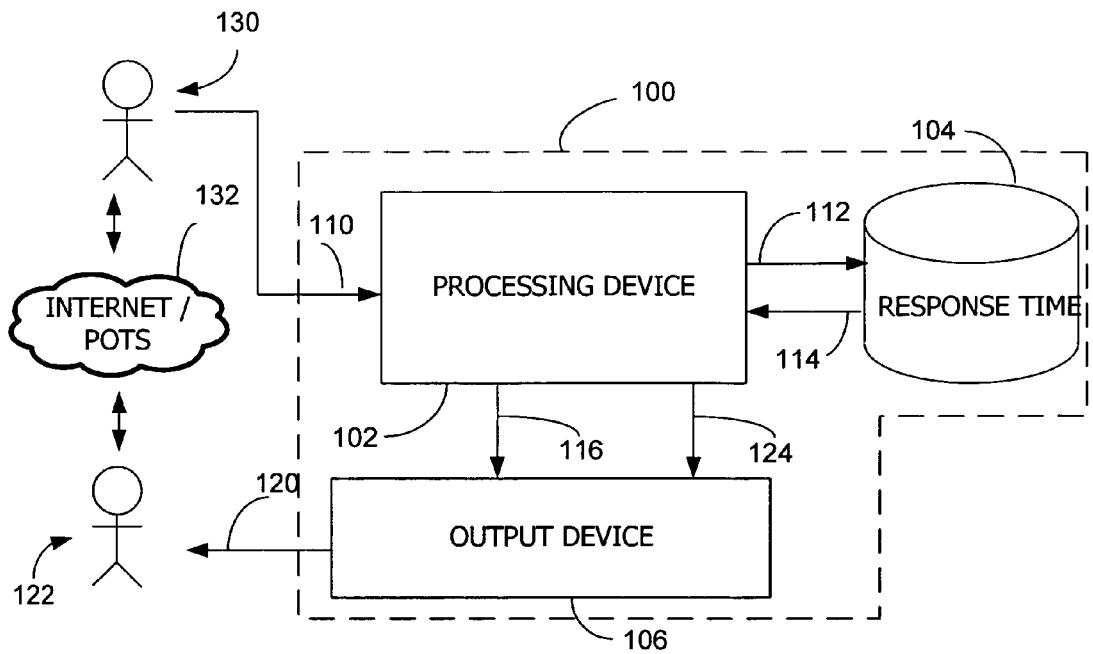
FIG. 1 illustrates a block diagram of one embodiment of an apparatus for monitoring a timely response to a user request.

More specifically, FIG. 1 illustrates an apparatus 100 for monitoring a timely response to a user request The apparatus 100 includes a processing device 102, a response time database 104 and an output device 106. The processing device 102 may be implemented in hardware, software or combination thereof for performing operating steps in response to executable instructions. The response time database 104 may be one or more storage devices having response time data stored therein. The output device 106 may be a device operative to provide an output, either directly to the user, e.g. a video display, through additional processing systems, e.g. an electronic mail application, or any other suitable type of device capable of providing an output.

The processing device 102 is operative to receive a user request 110. The request 110 may be received through an input portal, such as internet portal for example, a help section or linked web site having user assistance. The request 110 may also be received through other available means, such as an electronic message distribution system where a user enters information into a message screen and upon selection of a send button, the message 110 is encoded and transmitted to the processing device 102 using known data routing techniques.

Upon receipt of the user request 110, the processing device 102 may examine the request to determine request factors relating to the subject or related issues associated therewith. In one embodiment, the request may include header or other user-selected information relating to a particular application or a type of request. The request 110 may also include header information relating to the user's assessment of a priority level of a problem. For example, if the user submits the user request 110 through an applet or module, the software may include toggle buttons or pull down menus that allow the user to set a priority level to the message (e.g. high, medium or low) as well as select the corresponding application or function to which the problem relates.

The processing device 102, upon determining request factors, submits a search request 112 to the response time database 104. The database 104 includes various response times associated with different inquires, where these response times may be set by a governing standard relating to customer support guidelines. For example, a response time indicator may be that a message relating to a particular software application having a priority ranking of "high" is afforded a maximum response time of 48 hours, meaning that to be within the customer service guidelines, the user submitting the inquiry should be contacted within 48 hours. These request types each may have time indicators that designate the preferred response time.

Using known database search and data retrieval techniques, a response time indicator 114 is provided to the processing device 102, where the indicator 114 typically includes a time value, such as a set number of hours. The processing device 102 may thereupon assign a response time to the user request 110 by combining the response time indicator 114 with an internal time indicator providing when the request was submitted. From this response time, a deadline may be generated, where the deadline is the time by which the response is due. The deadline may be the same as the response time, but the deadline may include additional time to account for processing the user request and providing the request to an assistant.

The processing device 102 may thereupon generate a notification 116 which includes the user request and a deadline based on the response time. The notification 116 is submitted to the output device 106 so that it may be displayed or otherwise provided to an assistant 120. In one embodiment, the notification 116 is directed to the assistant 120, for example being specifically assigned to the assistant 120. In another embodiment, the notification 116 may be submitted to a general routing device and the notification is then forward to the assistant based on different factors, such as the assistant's experience level, the assistant's availability, the assistant's seniority, or other factors.

The processing device 102, while submitting the notification 116, also monitors the assistant's activities to determine if and when a response to the inquiry 110 is provided. Using an internal monitoring operation, a reminder is set internally in the processing device to examine if the request has been processed, e.g. addressed by the assistant 120. The processing device 102 sets this internal check at a pre-determined time prior to the expiration of the response time. For example, the pre-determined time may be a percentage of the response, such as, but not expressly limited to, ninety percent (90%) of the expiration of the response time. Therefore, in this example, if the response time is forty (40) hours, a check may occur at thirty-six (36) hours, which is ninety percent (90%) of the elapsed response time.

The processing device 102 thereupon determines if the user request 110 has been processed. This determination may be performed using a variety of techniques. For example, when the assistant attends to the user request, the assistant may select a flag indicating to the system that the request has been processed. In another embodiment, when the request is pulled up on the assistant's system, this may be used to indicate the response has been processed. In another embodiment, the processing device 102 may examine a response queue, as discussed in further detail below, to determine if the request is still within the queue, indicating that the assistant has not yet addressed the request.

The processing device 102 may thereupon generate a reminder 124 if it is determined that the request has been processed. The reminder 124 may be similar to the notification 118 including information relating to the user request and an indication of the intended response time. The reminder 124 may also include other information allowing for the assistant to better address the user request, such as a list of other assistants who may be able to attend to the request. Similarly, the reminder 124 may be sent to any number of recipients, not just the assistant. For example, the reminder 124 may be sent to a supervisor or manager that is in charge of monitoring the customer service response time. The reminder 124 may also be sent to other assistants who may be able to help out in attending to the time sensitive response. The reminder 124 may also be sent to a log file or other recording system to track the speed or response for assistants or a group of assistants as a whole.

To complete the processing of the user request 110, the assistant 122 contacts the user 130 through an interface 132. As illustrated in FIG. 1, the interface 132 may be an internet connection or a telephone connection, such as using existing telephone lines. Although, other techniques may be used to facilitate communication between the assistant 122 and the user 130. Through this interface 132, the assistant 122 and the user 130 may interact to resolve the problem or issue that was the subject of the request. Upon contacting the user 130 or resolution of the problem, the assistant 122 may update the processing device 102 to reflect an updated status of this request. In other embodiments, the processing device may be automatically updated based on applications that the assistant may use to process the request, for example an application may update a status file when the request is retrieved from a queue, indicating the assistant is addressing the concern.

Figure 2:
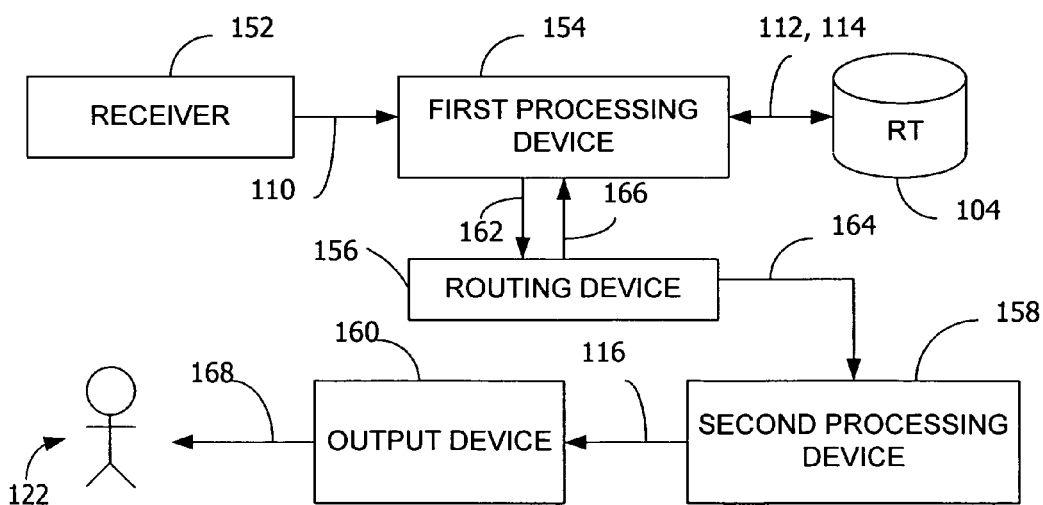
FIG. 2 illustrates a block diagram of another embodiment of a device for monitoring a timely response to a user request.

FIG. 2 illustrates a system for monitoring a timely response to a user request. The system 150 includes a receiver 152, a first processing device 154, the response time database 104, a routing device 156, a second processing device 158 and an output device 160 for the assistant 122. The system provides for the location of the second processing devices 158 to be external to the first processing device 154 and communication therebetween can be facilitated by the routing device 156. For example, the processing devices 154 and 158 may be within the same processing network or in another embodiment may include network access or server and terminal interconnections.

Figure 3:
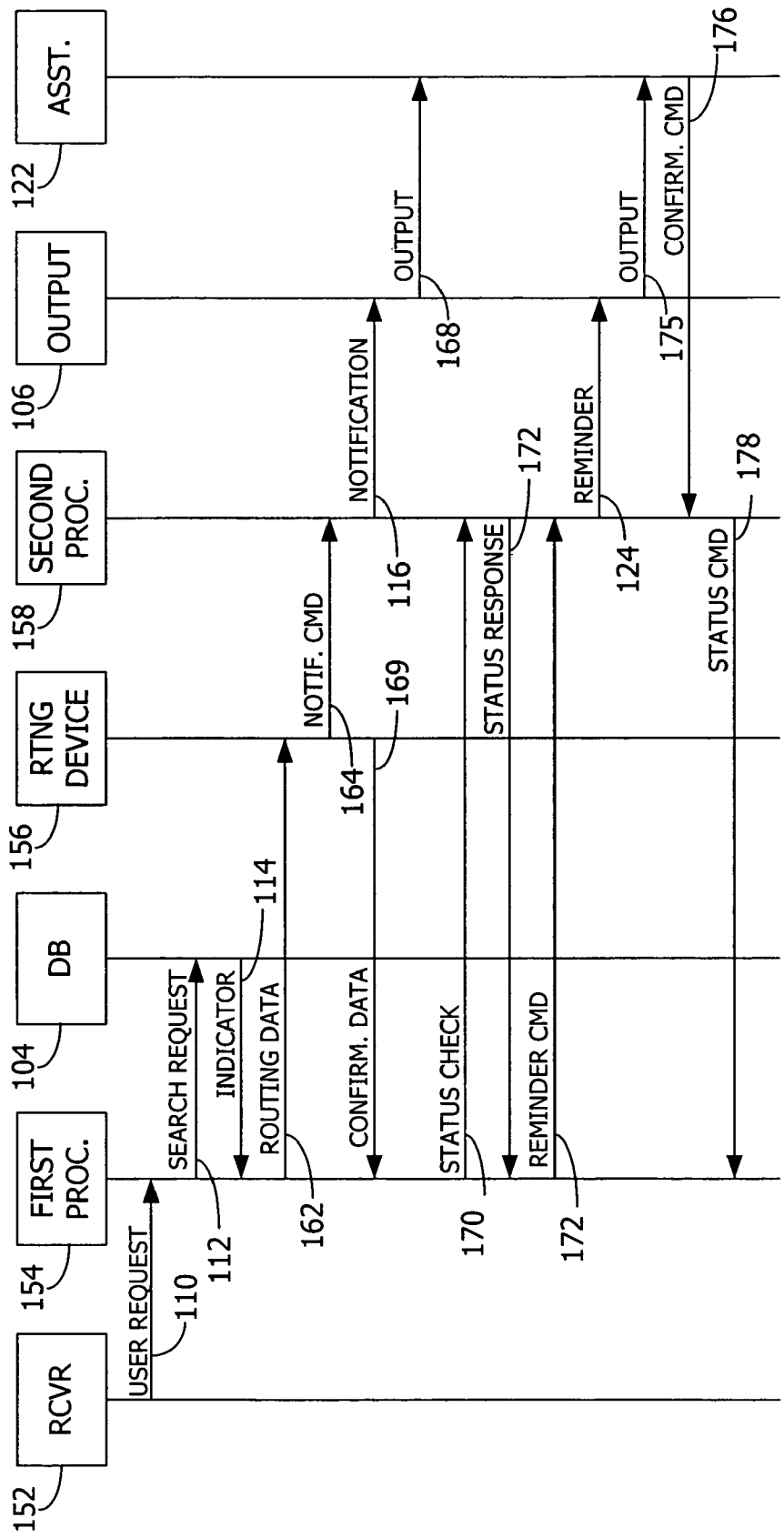
FIG. 3 illustrates a data flow diagram for one embodiment of a system for monitoring a timely response to a user request.

In one embodiment, the operation of the system of FIG. 2 can be described relative to the data flow chart of FIG. 3. The receiver 152 provides the user request 110 to the first processing device 154. The first processing device 154 provides the search request 112 to the response time database 104. In response to the search request 112, the database 104 provides the response time indicator 114 to the first processing device 154.

The first processing device 154 then determines an assistant to assign the user request 112. As described above, this determination may be made using any available technique, such as a queuing process or some other type of assignment procedure. The first processing device 154 thereupon generates the routing data 162 which includes the user request and response time. With the routing data 162, the routing device 156 is able to properly route a notification command 164 to the second processing device 158. The notification command 164 may include the information in the user request 110 as well as an indication of the corresponding response time or a deadline, which may be determined based on the response time indicator 114 and the time the user request 110 was received.

Initially, the second processing device 158 generates the notification reminder 116 and provides it to the output device 160. The output device 160 generates an output command 168 which is received by the assistant 122, such as a visual display on a monitor, a message or other type of notification. Similarly, as described in further detail below, the second processing device 158 may be receiving numerous notification commands for various user requests, therefore the second processing device 158 may also queue different user request or use some other means to record and/or prioritize the different commands.

Similarly, when the routing device 156 provides the notification command 164 to the second processing device 158, the routing device 156 may also provide information back to the first processing device 154, indicating that the second processing device 158 has received the notification command 164. This may then be a direct indication that the assistant 122 received the corresponding notification 116.

In one embodiment, as illustrated in the data flow of FIG. 3 the first processing device 154 may transmit a status check 170 to the second processing device 158. The status check 170 may be generated after the expiration of a predetermined period of time. The predetermined period of time may be a designated portion of the corresponding response time, such as the above example of 90% of a corresponding designated response time. The status check 170 may be used within systems where the second processing device 158 does not communicate back to the first processing device 154 when a user request has been processed. Therefore through the status check 170, the second processing device 158 may provide a status response 172. The status response 172 may indicate a simple yes or no whether the assistant 122 has addressed the user request 110.

Should the status response 172 indicate that the user request 110 has not been addressed, a reminder command 174 is generated from the first processing device 154. The reminder command 174 is provided to the second processing device 158 through the routing device 156. From this command 174, the second processing device 158 may extract data to provide a reminder 124 to the output device 160. In one embodiment, the reminder 124 may include a re-iteration of the user request and an indicator of the original response time as well as the amount of remaining time. Other information may be included such as priority information or a list of other potential assistants capable of taking responsibility for the user inquiry 110. Similarly, through the output device 160, a second output 175 is provided to the assistant 122 as a reminder of the approaching expiration of the corresponding response time.

As described above with regards to FIG. 1, when the assistant 122 is able to address the user request 110, the assistant 122 may perform such assistance through various connections, such as across the Internet or a telephone connection. When the assistant 122 has completed the particular task, the assistant 122 may generate a completion command 176, as illustrated in the flow diagram of FIG. 3. The confirmation command 176 may be provided to the second processing device 158. The second processing device 158 may generate a status update command 178 and provide the status update command 178 to the first processing device 154. With the status update command 178, the first processing device 154 updates the corresponding status of the user request 110 indicating that the time no longer needs to be monitored. Therefore, in the system of FIG. 2 as well as the data flow of FIG. 3 and for various embodiments, a timely response to a user request 110 may be actively monitored and corresponding updates may be provided to the first processing system 154 to ensure user inquiries are processed with a maximum processing time.

Figure 4:
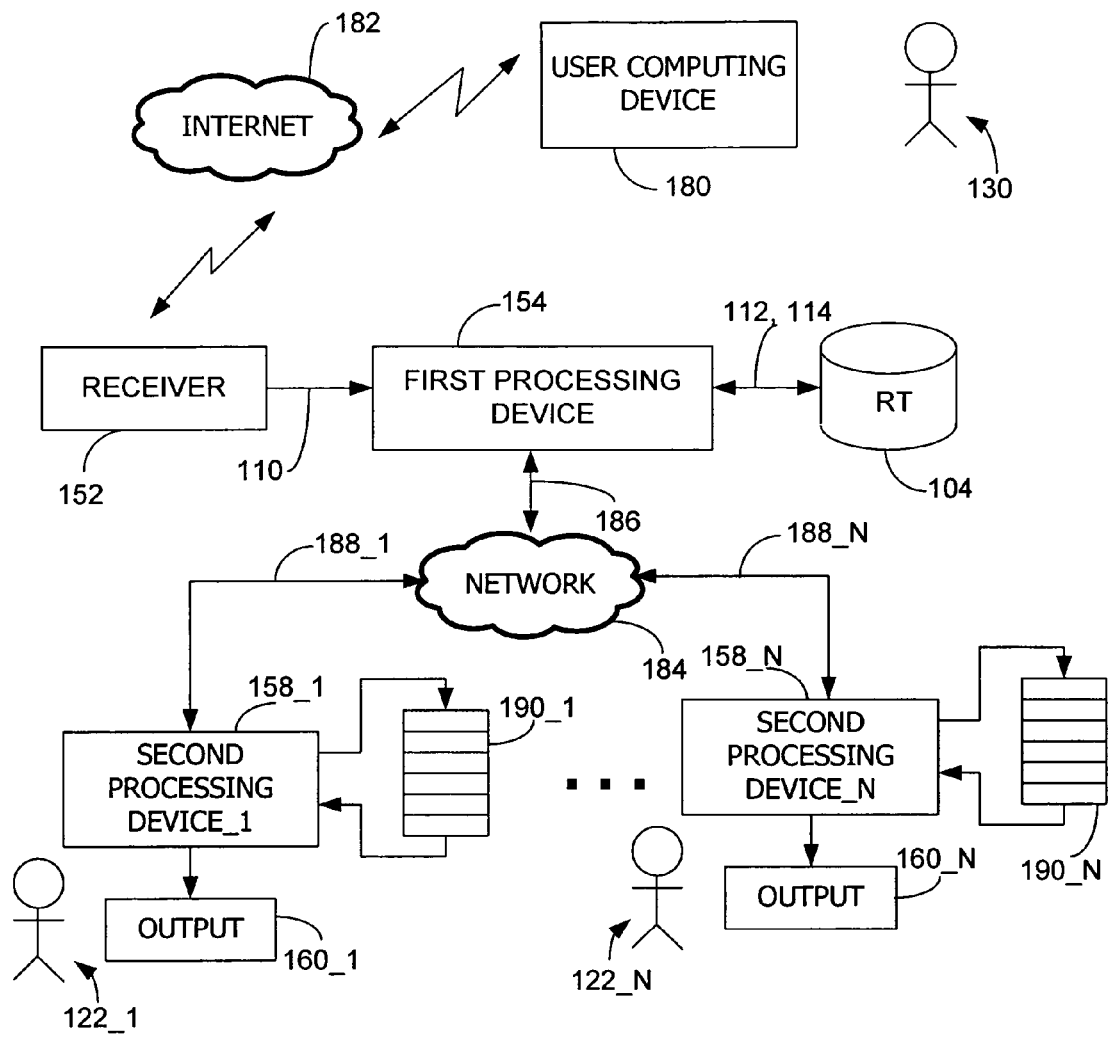
FIG. 4 illustrates an embodiment of a system for monitoring a timely response to a user request.

FIG. 4 illustrates another embodiment of a device providing for monitoring timely response for user requests. A user 130 provides input to their computing device 180 across an internet connection 182. As described above user may input text or other information through website or other internet based portal, e.g. email. Through the internet 182, the receiver 152 receives and provides the user request 110 to the first processing device 154. Similarly to the techniques described above, using the response time database 104, the search request 112 may be utilized to retrieve their response time indicator 114.

As illustrated in FIG. 4 the first processing device 154 communicates across a network 184 with any number of processing devices 158. Using a data command 186 with proper routing information, the network 184 provides direct connection 188 (shown as 188_1 and $188_{13}$ N) between the second processing devices 158 (shown as 158_1 and 158_N) and the first processing device 154, where the first processing device 154 may be disposed on a central server or central processing system and second processing device 158 may be disposed on remote processing systems. In this embodiment, the processing device 158 may include a queue 190 (shown as 190_1 and 190_N) where user requests may be stored and appropriately prioritized within the queue 190. The output device 160 may provide the immediate notification as provided from the first processing device 154 as well as the user request information when pulled from the queue 190. It is further noted the output device 160 may also display reminders provided from the first processing device 154.

In this system of FIG. 4, the first processing device 154 may determine one or more of the second processing devices 158 to receive the user request across the network 184. As illustrated in FIG. 4, any suitable number of second processing devices 158 may be in communication with the first processing device 154, such as remote processing devices or terminals networked to a central server or other type of processing device. Using queuing techniques, the first processing device 154 may be able to process numerous requests from different users and correspondingly distribute those request to different processing devices.

As various requests come in they may be assigned to one or more different assistance based on any number of factors, such as the assistant's technical ability, the assistant's availability, the type of inquiry or other factors. It is through the network 184, the first processing device 154 correspondingly distributes the user request 110. The first processing device 154 may also tract the status of these requests 110 by including internal information regarding the corresponding response time. In one embodiment a deadline is generated based on a designated start time that the user request is granted and the corresponding response time. The first processing device 154 include information relating to the predetermined time and based on that information may correspondingly determine when a check is to be performed of the status of the corresponding user inquiry.

As described above, one embodiment may include corresponding status checks at various times. In another embodiment, the processing device 158 may provide a feedback to the first processing device 154 indicating that user inquiry has been addressed and is fully processed.

The first processing 154 may also, through the network 184 reroute information as it is deemed important. For example, if in the status check 170, it is determined that the first processing device 158 is unable to address a particular concern, the first processing device may redirect the user request 110 to the second processing device 158 for assistant 122 to address. Once again, through the system, the status of various user request may be actively monitored.

In another embodiment, a request queue (not shown) may be used with the first processing device 154. User requests 110 may be retrieved by an assistant 122 based on assignment requests. For example, an assistant 122 may access the queue and retrieve specific inquiries instead of having user inquiries being specifically assigned, e.g., a data pull instead of a data push system.

Figure 5:
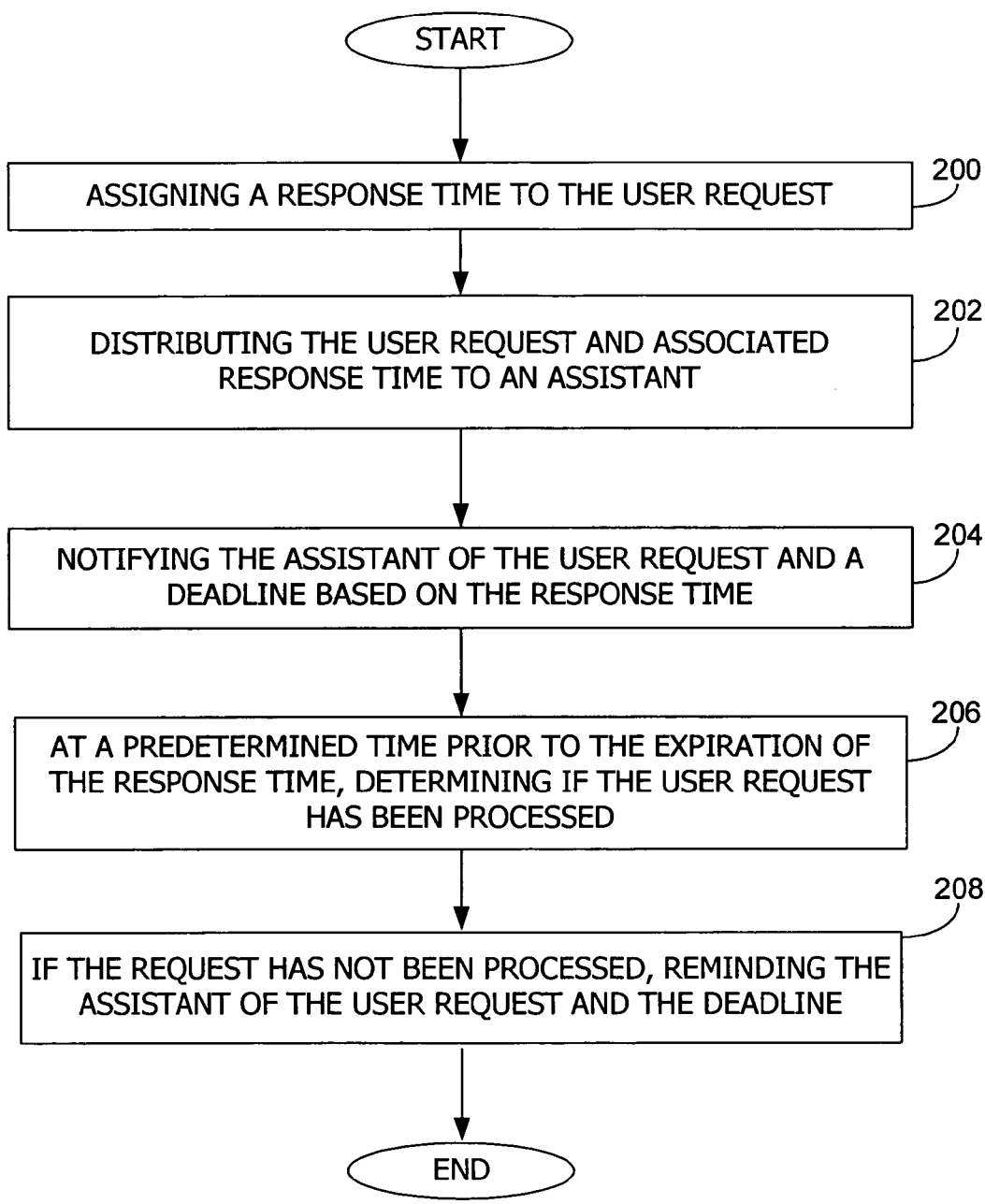
FIG. 5 illustrates a flowchart having the steps of one embodiment of a method for monitoring a timely response to a user request.

FIG. 5 illustrates the steps of one embodiment of a method for monitoring a timely response to a user request. The method includes, step 200, assigning a response time to the user request. As discussed above, the user request 110 is received and based on searching a corresponding response time database 104, the response time indicator 114 is retrieved and based on that information a deadline is generated. The next step, step 202, is distributing the user request and associated response time to an assistant. In one embodiment, a routing device may be used to transfer this information. Other embodiments may include routing information for transmitting user requests an associated response time through a network communication using standard network communication using standard network routing protocols.

The next step, step 204 is notifying the assistant of the user request and a deadline based on the response time. The notification may include providing a notification command to an output device, such as output device 106 and the deadline includes a combination of the response time calculated from an initial start time. For example if a request was submitted at 12 noon and the response time assigned to the request is 6 hours, the deadline would be 6 p.m. The next step, step 206, is at a predetermined time prior to expiration of the response time, determining if the user request has been processed. As discussed above, this may be performed using various techniques including status checks or updating status field if the assistant provides a feedback to a central processing system.

In one embodiment the next step 208 is if the request has not been processed reminding the assistant of the user request and the deadline. This step may include generating a second output, from the reminder output 124 provided to the output device 106, reminding the assistant of the pending deadline. Therefore, through this method the response time to a user request may be actively monitored and a reminder may be issued to ensure response time is within a predetermined time interval.

In one embodiment, when the user request is received, the response time may be determined based on the content or type of the request. As described above, indicators may be included in the request that provide for a corresponding response time, for example if the request relates to a particular product, a response time may be determined to be several days. Similarly, the assignment of the user request may be based request subject. For example, one or more assistants may be deemed the proper recipient of the request based on different factors, such as credentials or experience levels of the assistant, the time availability of the assistant, or other factors.

Therefore, the maximum processing time may be monitored and controlled for a user request. The request is processed and assigned a corresponding response time with a deadline for when the assistant is to reply to or seek a solution to the user's request. An internal monitoring of this time provides a follow-up notification when a percentage of the response time has expired. Therefore, the system monitors the response by including a follow-up query to the assistant as to the status of the response to the user request.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for monitoring a timely response to a user request, the apparatus comprising:
   a processing device operative to:
      receive the user request;
      determine request factors from the user request;
      submit a search request based on the request factors to a response time database, wherein the database includes various response times associated with different inquiries where the response times are set by a governing standard relating to customer support guidelines;
      assign a response time to the user request from the response time database;
      generate a notification including the user request and a deadline based on the response time; and
      assign the notification to an assistant to respond to the user request from a plurality of assistants based at least on one of: the assistant's availability, the assistant's experience level, and the assistant's seniority;

an output device coupled to the processing device for receiving and displaying the notification; and the processing device further operative to:
- prior to the expiration of the response time, determine if the user request has been processed; and
- generate a reminder if the request has not been processed; and a routing device operative to route the notification to the assistant.

2. The apparatus of claim 1 further comprising:
an input device operative to receive the user request from an input portal and
provide the user request to the processing device.

3. The apparatus of claim 1 further comprising:
a request queue coupled to the processing device such that the user request is stored in the request queue.

4. The apparatus of claim 3 wherein the request queue includes a plurality of user requests each having response times such that the users requests are stored in the queue based on the corresponding response times.

5. A computer-implemented method for monitoring a timely response to a user request, the method comprising:
- determining by a processing device request factors from the user request;
- submitting by the processing device a search request based on the request factors to a response time database, wherein the database includes various response times associated with different inquiries where the response times are set by a governing standard relating to a customer support guidelines;
- assigning by the processing device a response time to the user request from the response time database;
- assigning by the processing device the user request and associated response time to an assistant to respond to the user request from a plurality of assistants based at least on one of: the assistant's availability, the assistant's experience level, and the assistant's seniority;
- notifying by an output device the assistant of the user request and a deadline based on the response time;
- at a pre-determined time prior to the expiration of the response time, determining by the processing device if the user request has been processed; and
- if the request has not been processed, reminding by the output device the assistant of the user request and the deadline.

6. The computer-implemented method of claim 5 further comprising:
if the request has not been processed at a preset time prior to the expiration of the response time, distributing by the processing device the user request to a second assistant.

7. The computer-implemented method of claim 5 further comprising:
receiving by the processing device the user request and the deadline in a remote processing system; and
writing by the processing device the user request to a request queue.

8. The computer-implemented method of claim 7 further comprising:
writing by the processing device the response time to a calendar application.

9. The computer-implemented method of claim 7 wherein the request queue includes a plurality of user requests having different response times, the method further comprising:
sorting by the processing device the user requests based on the response times.

10. The computer-implemented method of claim 5 further comprising:
receiving the user request from an input portal; and
processing by the processing device the user request to determine a request subject.

11. The computer-implemented method of claim 10 further comprising:
assigning by the processing device the response time to the user request based on the request subject.

12. The computer-implemented method of claim 11 further comprising:
assigning by the processing device the user request to the assistant based on the request subject.

13. The computer-implemented method of claim 5 further comprising:
prior to distributing the user request to an assistant, displaying the user request in a central display location;
receiving by the processing device an assignment requests from assistant.

* * * * *

UNITED STATES PATENT AND TRADEMARK OFFICE
CERTIFICATE OF CORRECTION

PATENT NO. : 7,613,281 B2
APPLICATION NO. : 11/300569
DATED : November 3, 2009
INVENTOR(S) : Singhai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Nineteenth Day of October, 2010

David J. Kappos
*Director of the United States Patent and Trademark Office*